United States Patent
Yang

(10) Patent No.: US 11,265,947 B2
(45) Date of Patent: Mar. 1, 2022

(54) WIRELESS LOCAL AREA NETWORK (WLAN) STATUS MANAGEMENT METHOD AND DEVICE, STORAGE MEDIUM AND ELECTRONIC DEVICE

(71) Applicant: XI'AN ZHONGXING NEW SOFTWARE CO., LTD., Shaanxi (CN)

(72) Inventor: Kun Yang, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 16/764,867

(22) PCT Filed: Dec. 25, 2018

(86) PCT No.: PCT/CN2018/123637
§ 371 (c)(1),
(2) Date: May 17, 2020

(87) PCT Pub. No.: WO2019/165837
PCT Pub. Date: Sep. 6, 2019

(65) Prior Publication Data
US 2020/0389932 A1 Dec. 10, 2020

(30) Foreign Application Priority Data
Feb. 28, 2018 (CN) .......................... 201810169083.5

(51) Int. Cl.
*H04W 76/18* (2018.01)
*H04W 76/19* (2018.01)
(Continued)

(52) U.S. Cl.
CPC ............. *H04W 76/18* (2018.02); *H04W 8/08* (2013.01); *H04W 24/08* (2013.01); *H04W 76/19* (2018.02); *H04W 84/12* (2013.01)

(58) Field of Classification Search
CPC ....... H04W 76/18; H04W 76/19; H04W 8/08; H04W 24/08; H04W 84/12; H04W 24/02; H04W 24/10; H04L 43/0811; H04L 43/08
See application file for complete search history.

(56) References Cited

U.S. PATENT DOCUMENTS 7,941,521 B1 * 5/2011 Petrov ..................... H04L 43/08
709/224
2016/0113047 A1 4/2016 Chen
(Continued)

FOREIGN PATENT DOCUMENTS

CN 102104465 A 6/2011
CN 106254049 A 12/2016
(Continued)

OTHER PUBLICATIONS

International Search Report for corresponding application PCT/CN2018/123637 filed Dec. 25, 2018; dated Mar. 14, 2019.
(Continued)

*Primary Examiner* — Said M Elnoubi
(74) *Attorney, Agent, or Firm* — Cantor Colburn LLP

(57) ABSTRACT

The present invention provides a Wireless Local Area Network (WLAN) status management method and device, a storage medium and an electronic device. The method includes that: configuration information is acquired, the configuration information being configured to indicate a maximum data amount, allowed to be cached, of a WLAN in a suspended status before User Equipment (UE) determines a WLAN connection failure (S202); and a WLAN status is managed according to the configuration information (S204). According to the present invention, the technical
(Continued)

problem in the related art that UE cannot effectively monitor a WLAN status is solved.

20 Claims, 2 Drawing Sheets

(51) Int. Cl.
*H04W 8/08* (2009.01)
*H04W 24/08* (2009.01)
*H04W 84/12* (2009.01)

(56) References Cited

U.S. PATENT DOCUMENTS

2018/0027438 A1 1/2018 Wu
2019/0053130 A1* 2/2019 Guo ..................... H04L 1/0026

FOREIGN PATENT DOCUMENTS

| CN | 106899582 A | 6/2017 | | |
|---|---|---|---|---|
| WO | 2017134641 A1 | 8/2017 | | |
| WO | WO-2017134641 A1 | * | 8/2017 | .............. H04W 8/02 |
| WO | 2017171898 A1 | 10/2017 | | |
| WO | WO-2017171898 A1 | * | 10/2017 | ............ H04W 76/25 |

OTHER PUBLICATIONS

Huawei, HiSilicon, "Remaining issues of LWA suspend and resume", 3GPP TSG-RAN2 Meeting #96 R2-167701 Reno, USA, Nov. 14-18, 2016.
Nokia, Alcatel-Lucent Shanghai Bell, "Considerations on suspend resume", 3GPP TSG-RAN WG2 Meeting #97 R2-1700737 Athens, Greece, Feb. 13-17, 2017.
Qualcomm Incorporated, "Resuming Temporary WLAN Suspension", 3GPP TSG-RAN2 Meeting #96 R2-168685 Reno, NV, USA Nov. 14-18, 2016.

* cited by examiner

WIRELESS LOCAL AREA NETWORK (WLAN) STATUS MANAGEMENT METHOD AND DEVICE, STORAGE MEDIUM AND ELECTRONIC DEVICE

TECHNICAL FIELD

The present disclosure relates to the field of communications, and particularly to a WLAN status management method and device, a storage medium and an electronic device.

BACKGROUND

In a Long Term Evolution (LTE)-WLAN Aggregation (LWA) architecture, an LTE base station (for example, an Evolved Node B (eNB), a gNB and a Node B (NB)) allows access of a WLAN base station (for example, a WLAN Termination (WT)) such that the LTE base station may allocate and schedule a radio resource more flexibly according to signal conditions, loads, resource states, channel conditions and the like of an LTE network and a WLAN to make it possible to simultaneously transmit data of the same bearer in LTE and WLAN links to further improve Quality of Service (QoS) for a user and an overall communication system capacity.

However, in a specific using process, it is often found that User Equipment (UE) cannot effectively monitor a WLAN status and timely and effectively learn the WLAN status, which seriously influences utilization efficiency of the UE for a WLAN.

For the problem in the related art, there is yet no effective solution found at present.

SUMMARY

Embodiments of the present disclosure provide a WLAN status management method and device, a storage medium and an electronic device.

According to an embodiment of the present disclosure, a WLAN status management method is provided, which may include that: configuration information is acquired, the configuration information being configured to indicate a maximum data amount, allowed to be cached, of a WLAN in a suspended status before UE determines a WLAN connection failure; and a WLAN status is managed according to the configuration information.

According to another embodiment of the present disclosure, a WLAN status management device is provided, which may include: an acquisition module, configured to acquire configuration information, the configuration information being configured to indicate a maximum data amount, allowed to be cached, of a WLAN in a suspended status before UE determines a WLAN connection failure; and a setting module, configured to manage a WLAN status according to the configuration information.

According another embodiment of the present disclosure, a storage medium is also provided, in which a computer program may be stored, the computer program being configured to run to execute the operations in any abovementioned method embodiment.

According to another embodiment of the present disclosure, an electronic device is also provided, which may include a memory and a processor. A computer program may be stored in the memory. The processor may be configured to run the computer program to execute the operations in any abovementioned method embodiment.

According to the embodiments of the present disclosure, the configuration information configured to indicate the maximum data amount, allowed to be cached, of the WLAN in the suspended status before the UE determines the WLAN connection failure is acquired, so that the UE can timely update a setting of a WLAN connection status and report the WLAN connection status, and the technical problem in the related art that UE cannot effectively monitor a WLAN status can be solved.

BRIEF DESCRIPTION OF THE DRAWINGS

The drawings described here are adopted to provide a deeper understanding to the present disclosure and form a part of the present application. Schematic embodiments of the present disclosure and descriptions thereof are adopted to explain the present disclosure and not intended to form improper limits to the present disclosure. In the drawings.

DETAILED DESCRIPTION OF THE EMBODIMENTS

The present disclosure will be described below with reference to the drawings and in combination with the embodiments in detail. It is to be noted that the embodiments in the present application and characteristics in the embodiments may be combined without conflicts.

It is to be noted that the terms like "first" and "second" in the specification, claims and accompanying drawings of the present disclosure are used for differentiating the similar objects, but do not have to describe a specific order or a sequence.

Embodiment 1

Figure 1:
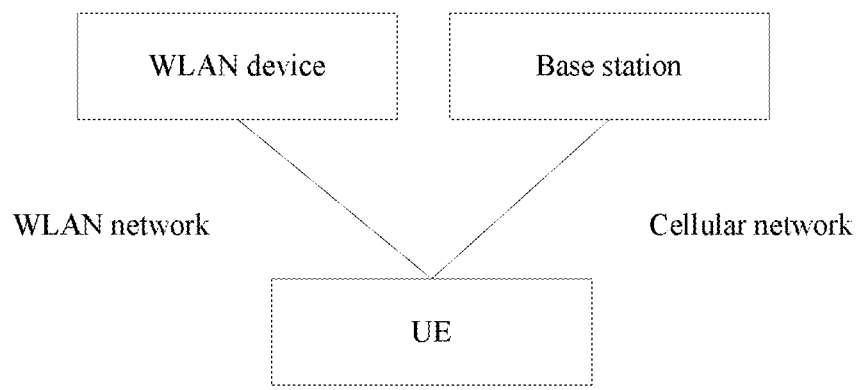
FIG. 1 is a diagram of a network architecture according to an embodiment of the present disclosure.

The embodiment of the present application may run in a network architecture shown in FIG. 1. FIG. 1 is a diagram of a network architecture according to an embodiment of the present disclosure. As shown in FIG. 1, the network architecture includes UE, a base station of a cellular network and a WLAN device. The UE may be connected with the base station and the WLAN device.

Figure 2:
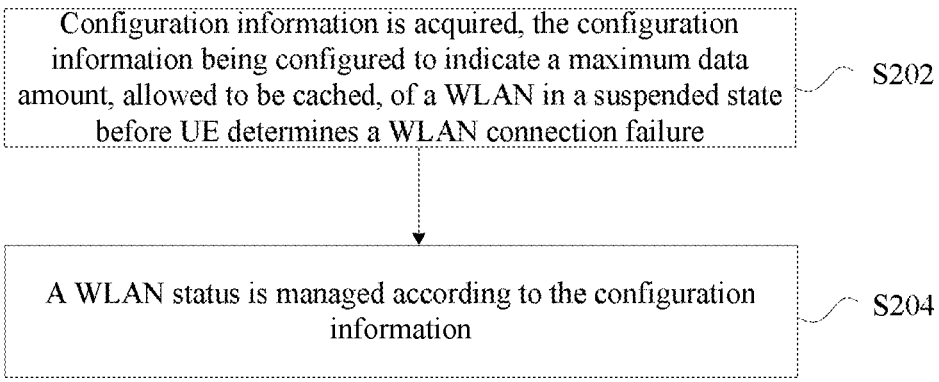
FIG. 2 is a flowchart of a WLAN status management method according to an embodiment of the present disclosure.

The embodiment provides a WLAN status management method running in the abovementioned network architecture. FIG. 2 is a flowchart of a WLAN status management method according to an embodiment of the present disclosure. As shown in FIG. 2, the flow includes the following operations.

In S202, configuration information is acquired, the configuration information being configured to indicate a maximum data amount, allowed to be cached, of a WLAN in a suspended status before UE determines a WLAN connection failure.

In S204, a WLAN status is managed according to the configuration information.

Based on the operations, the configuration information configured to indicate the maximum data amount, allowed to be cached, of the WLAN in the suspended status before the UE determines the WLAN connection failure is acquired, so that the UE can timely update a setting of a WLAN connection status and report the WLAN connection status, and the technical problem in the related art that UE cannot effectively monitor a WLAN status can be solved.

In an exemplary embodiment, an executor of the operations may be, but not limited to, a base station, the UE and the like.

In an exemplary embodiment, the UE executes management. The operation that the configuration information is acquired may include that: the UE receives first configuration information sent by a base station.

In an exemplary embodiment, after the operation that the configuration information is acquired, the method may further include that: when WLAN connections with all WLANs in a WLAN mobility set change to be temporarily unavailable, the WLAN status of the UE is set to be "suspended"; and the UE sets and starts a first counter according to a first suspending amount, the first configuration information including the first suspending amount.

In an exemplary embodiment, the operation that the WLAN status is managed according to the configuration information may include that: when a last WLAN connection status report of the UE indicates that a WLAN connection status of the UE is "suspended" and the WLAN connection with any WLAN in the WLAN mobility set is successfully reestablished or kept, the UE sets the WLAN status to be "resumed" and stops and resets the first counter.

In an exemplary embodiment, the operation that the WLAN status is managed according to the configuration information may include that: when the first counter reaches the first suspending amount, the WLAN status of the UE is set to be "failure", and WLAN status monitoring and WLAN connection attempting are stopped.

In another exemplary embodiment, the base station executes management. The operation that the configuration information is acquired may include that: the base station acquires second configuration information from a local preset parameter.

In an exemplary embodiment, after the operation that the configuration information is acquired, the method may further include that: when WLAN connections with all the WLANs in the WLAN mobility set change to be temporarily unavailable, the WLAN status of the UE is set to be "suspended"; the UE executes a WLAN connection status reporting process to obtain a first WLAN connection status report; and the UE sends the first WLAN connection status report to the base station, the first WLAN connection status report being configured to trigger the base station to set and start a second counter according to a second suspending amount, the second configuration information including the second suspending amount.

In an exemplary embodiment, the operation that the WLAN status is managed according to the configuration information may include that: when a last WLAN connection status report of the UE indicates that the WLAN connection status of the UE is "suspended" and the WLAN connection with any WLAN in the WLAN mobility set is successfully reestablished or kept, the UE sets the WLAN status to be "resumed" and executes the WLAN connection status reporting process to obtain a second WLAN connection status report, the second WLAN connection status report being configured to trigger the base station to stop and reset the second counter.

In an exemplary embodiment, the operation that the WLAN status is managed according to the configuration information may include that: when the second counter reaches the second suspending amount, the base station sets the WLAN status of the UE to be "failure" and stops WLAN connection attempting.

In an exemplary embodiment, the configuration information may include a joint transmission LWA configuration between a WLAN network and an LTE network.

Through the above descriptions about the implementation modes, those skilled in the art may clearly know that the methods according to the embodiment may be implemented in a manner of combining software and a required universal hardware platform and, of course, may also be implemented through hardware, but the former is a preferred implementation mode under many circumstances. Based on such an understanding, the technical solutions of the present disclosure substantially or parts making contributions to a conventional art may be embodied in form of a software product. The computer software product is stored in a storage medium (for example, a Read-Only Memory (ROM)/Random Access Memory (RAM), a magnetic disk and an optical disk), including a plurality of instructions configured to enable a terminal device (which may be a mobile phone, a computer, a server, a network device or the like) to execute the method of each embodiment of the present disclosure.

Embodiment 2

The embodiment also provides a WLAN status management device, which is configured to implement the above-mentioned embodiments and preferred implementation modes. What has been described will not be elaborated. For example, term "module" used below may be a combination of software and/or hardware capable of realizing a preset function. Although the device described in the following embodiment is preferably implemented with software, implementation with hardware or a combination of the software and the hardware is also possible and conceivable.

Figure 3:
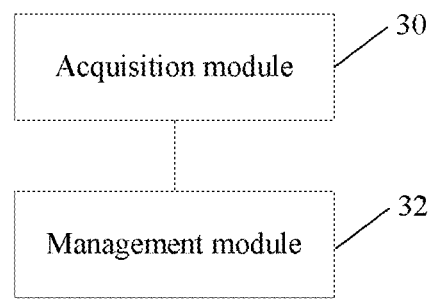
FIG. 3 is a structure block diagram of a WLAN status management device according to an embodiment of the present disclosure.

FIG. 3 is a structure block diagram of a WLAN status management device according to an embodiment of the present disclosure. As shown in FIG. 3, the device includes:

an acquisition module 30, configured to acquire configuration information, the configuration information being configured to indicate a maximum data amount, allowed to be cached, of a WLAN in a suspended status before UE determines a WLAN connection failure; and a management module 32, configured to manage a WLAN status according to the configuration information.

In an exemplary embodiment, the device of the embodiment may be arranged in the UE or a base station. Specific implementation solutions have been described in embodiment 1 and will not be elaborated herein.

It is to be noted that each module may be implemented through software or hardware and, under the latter condition, may be implemented in, but not limited to, the following manner: the modules are all positioned in the same processor, or the modules are positioned in different processors in any combination form respectively.

Embodiment 3

The embodiment provides a WLAN suspending management solution, to at least partially solve the problem that UE cannot effectively monitor a WLAN status.

The solution of the embodiment may include the following two implementation manners.

A first implementation manner

A UE receives an LWA configuration transmitted by an eNB, the LWA configuration including a suspendAmount (suspending amount) parameter.

If WLAN connections with all WLANs in a WLAN mobility set change to be temporarily unavailable, the UE performs the following operations:

the UE sets a WLAN status to be "suspended";

the UE sets and starts (or restarts) a counter COUNT1 according to the suspendAmount parameter; and the UE executes a WLAN connection status reporting process.

If a WLAN connection status in a last WLAN connection status report of the UE is "suspended" and the WLAN connection with a WLAN in the WLAN mobility set is successfully reestablished or kept, the UE performs the following operations:

the UE sets the WLAN status to be "resumed";

the UE stops and resets the counter COUNT1 if the counter COUNT1 is running; and the UE executes the WLAN connection status reporting process.

Alternatively, when a value of the counter COUNT1 reaches a value indicated by the suspendAmount parameter, the UE performs the following operations:

the UE sets the WLAN status to be "failure";

the UE executes the WLAN connection status reporting process; and the UE stops WLAN status monitoring and WLAN connection attempting.

A second implementation manner

A local WLAN suspending configuration of an eNB includes a suspendAmount parameter.

If WLAN connections with all WLANs in a WLAN mobility set change to be temporarily unavailable, UE performs the following operations:

the UE sets a WLAN status to be "suspended"; and the UE executes a WLAN connection status reporting process.

The eNB starts (or restarts) a counter COUNT2 according to a WLAN connection status report.

If a WLAN connection status in a last WLAN connection status report of the UE is "suspended" and the WLAN connection with a WLAN in the WLAN mobility set is successfully reestablished or kept, the UE performs the following operations:

the UE sets the WLAN status to be "resumed";

the UE executes the WLAN connection status reporting process.

The eNB stops and resets the counter COUNT2 according to a WLAN connection status report if the counter COUNT2 is running.

Alternatively, when a value of the counter COUNT2 reaches a value indicated by the suspendAmount parameter, the eNB performs the following operations:

the eNB sets the WLAN status of the UE to be "failure"; and the eNB stops WLAN connection attempting.

Figure 4:
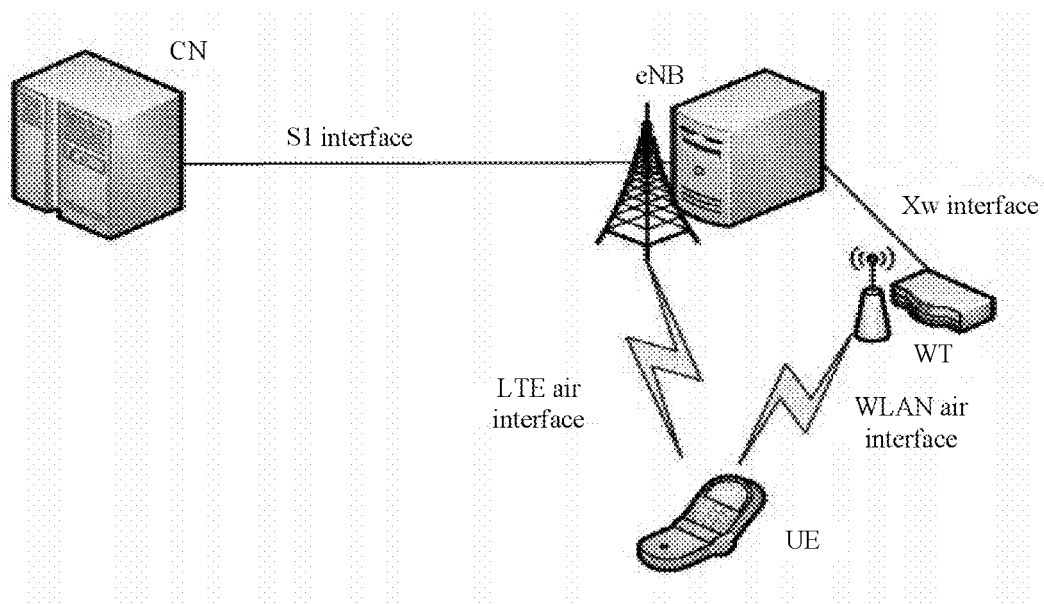
FIG. 4 is a schematic diagram of an LWA architecture according to an embodiment.

FIG. 4 is a schematic diagram of an LWA architecture according to an embodiment. An eNB is connected with a Core Network (CN) through an S1 interface. The eNB is connected with UE through an LTE air interface. A WLAN Access Point (WLAN AP, abbreviated as WT) is connected with the UE through a WLAN air interface. An LTE base station may include the eNB. A WLAN base station may include the WT. The eNB performs information interaction with the WT through a network-side non-ideal loop or an ideal/internal loop. In a scenario where the eNB is not co-located with the WT, the eNB is connected with the WT through an Xw interface.

Since the UE cannot effectively monitor a WLAN status, it is found that, when the UE is allowed to use a suspended-resumed mechanism and if WLAN connections of the UE with all WLANs in a WLAN mobility set change to be temporarily unavailable, the UE sets a WLAN connection status to be "suspended" and reports the WLAN connection status and, if the WLAN connection status in a last WLAN connection status report of the UE is "suspended" and the WLAN connection with a WLAN in the WLAN mobility set is successfully reestablished or kept, the UE sets the WLAN connection status to be "resumed" and reports the WLAN connection status. However, a data amount cached when the UE sets the WLAN connection status to be "suspended" is not limited. Consequently, there may be such a condition that the WLAN connection of the UE with the WLAN in the WLAN mobility set may not be successfully reestablished or kept for a long time, the UE does not update a setting of the WLAN connection status and report the WLAN connection status for a long time, and therefore the UE cannot effectively monitor the WLAN status.

In view of this, in the embodiment of the present disclosure, the cached data amount is statistically judged when the UE sets the WLAN connection status to be "suspended". In such a manner, the data amount cached when the UE sets the WLAN connection status to be "suspended" is limited, so that the setting of the WLAN connection status is timely updated, the WLAN connection status is reported, and furthermore, the condition that the UE caches a large number of LWA Protocol Data Units (PDUs) sent through the WLANs is avoided.

The embodiment also includes the following implementation modes for completely describing the abovementioned implementation manners.

Implementation Mode 1

The solution includes the following operations.

In operation 1, an Information Element (IE) "LWA configuration" transmitted by an eNB is received, a field "LWA mobility configuration (lwa-MobilityConfig)" in the IE including the following parameter:

"wlan-SuspendAmount" configured to indicate a maximum data amount allowed to be cached when UE sets a WLAN connection status to be "suspended" before a WLAN connection failure report is triggered.

In operation 2, the UE sets a field "suspendAmount" in an IE "VarWLAN-Status" to be a value of the suspendAmount parameter.

If a field "wlan-SuspendResumeAllowed" in an IE "VarWLAN-MobilityConfig" is set to be TRUE, the UE is allowed to use a suspended-resumed mechanism.

If WLAN connections with all WLANs in a WLAN mobility set change to be temporarily unavailable, the UE executes the operations of setting a field status in the IE "VarWLAN-Status" to be "suspended" and setting and starting (or restarting) a counter COUNT1 according to the value of the field "suspendAmount".

The counter COUNT1 is stopped when the UE is successfully connected to a WLAN, WLAN connection fails, RRC_CONNECTED is quit, a switching process is triggered or a connection reestablishment process is initiated.

In operation 3, the UE reports a WLAN connection status report (WLANConnectionStatusReport) message, a field status in an IE "WLAN-Status" of the message being set to be a value of the field status in the IE "VarWLAN-Status", i.e., "suspended".

In operation 4, the eNB receives the message reported by the UE, and if parsing the field status in the IE "WLAN-Status" of the message to be "suspended", stores an LWA context of the UE and sets the field status in the IE "WLAN-Status" to be the value of the field status in the IE "WLAN-Status" of the message, i.e., "suspended".

In operation 5, if the WLAN connection status in a last WLAN connection status report of the UE is "suspended" and the WLAN connection with a WLAN in the WLAN mobility set is successfully reestablished or kept, the UE executes the operations of setting the field status in the IE "VarWLAN-Status" to be "resumed" and stopping and resetting the counter COUNT1.

In operation 6, the UE reports a WLAN connection status report message, a field status in an IE "WLAN-Status" of the message being set to be the value of the field status in the IE "VarWLAN-Status", i.e., "resumed".

In operation 7, the eNB receives the connection status report message reported by the UE, and if parsing the field status in the IE "WLAN-Status" of the message to be "resumed", sets the field status in the IE "WLAN-Status" to be the value of the field status in the IE "WLAN-Status" of the message, i.e., "resumed".

In operation 8, the UE follows configuration information in the IE "LWA-Configuration" transmitted by the eNB, continues receiving and/or sending an LWA PDU through the WLAN and proceeds to operation 2.

In operation 9, when a value of the counter COUNT1 reaches the value of the field "suspendAmount", the UE executes the operation of setting the field status in the IE "VarWLAN-Status" to be "failure".

In operation 10, the UE reports a WLAN connection status report message, a field status in an IE "WLAN-Status" of the message being set to be the value of the field status in the IE "VarWLAN-Status", i.e., "failure", and stops WLAN status monitoring and WLAN connection attempting.

In operation 11, the eNB receives the connection status report message reported by the UE, and if parsing the field status in the IE "WLAN-Status" of the message to be "failure", sets the field status in the IE "WLAN-Status" to be the value of the field status in the IE "WLAN-Status" of the message, i.e., "failure".

Implementation Mode 2

In the implementation mode, when UE reports that a WLAN connection status is "suspended", an eNB triggers a "suspending" counter. In such a manner, a maximum data amount cached by the eNB when the WLAN connection status of the UE is set to be "suspended" is limited, so that a setting of the WLAN connection status of the UE is timely updated, and the condition that a network side (the eNB) caches a large number of LWA PDUs sent through a WLAN is avoided. The following operations are included.

In operation 1, if a field "wlan-SuspendResumeAllowed" in an IE "VarWLAN-MobilityConfig" is set to be TRUE, the UE is allowed to use a suspended-resumed mechanism; and if WLAN connections with all WLANs in a WLAN mobility set change to be temporarily unavailable, the UE executes the operations of setting a field status in an IE "VarWLAN-Status" to be "suspended".

In operation 2, the UE reports a WLAN connection status report (WLANConnectionStatusReport) message, a field status in an IE "WLAN-Status" of the message being set to be a value of the field status in the IE "VarWLAN-Status", i.e., "suspended".

In operation 3, the eNB receives the message reported by the UE, and if parsing the field status in the IE "WLAN-Status" of the message to be "suspended", stores an LWA context of the UE and sets the field status in the IE "WLAN-Status" to be the value of the field status in the IE "WLAN-Status" of the message, i.e., "suspended".

If an IE "WLAN suspending configuration" (WLAN-SuspendConfig) includes the following field:

"WLAN suspending counter" (wlan-SuspendAmount) configured to indicate a maximum data amount allowed to be cached when the eNB sets the WLAN connection status of the UE to be "suspended" before a WLAN connection failure report is received, the eNB sets and starts (or restarts) a counter COUNT2 according to a value of the field "suspendAmount".

In operation 4, if the WLAN connection status in a last WLAN connection status report of the UE is "suspended" and the WLAN connection with a WLAN in the WLAN mobility set is successfully reestablished or kept, the UE executes the operation of setting the field status in the IE "VarWLAN-Status" to be "resumed".

In operation 5, the UE reports a WLAN connection status report message, a field status in an IE "WLAN-Status" of the message being set to be the value of the field status in the IE "VarWLAN-Status", i.e., "resumed".

In operation 6, the eNB receives the connection status report message reported by the UE, and if parsing the field status in the IE "MILAN-Status" of the message to be "resumed", the eNB executes the operations of setting the field status in the IE "WLAN-Status" to be the value of the field status in the IE "WLAN-Status" of the message, i.e., "resumed", and stopping and resetting the counter COUNT2.

In operation 7, the UE follows configuration information in an IE "LWA-Configuration" transmitted by the eNB, continues receiving and/or sending an LWA PDU through the WLAN and proceeds to operation 2.

In operation 8, when a value of the counter COUNT2 reaches the value of the field "suspendAmount", the eNB executes the operations of setting the field status in the IE "VarWLAN-Status" to be "failure" and stops and resetting the counter COUNT2.

The embodiment provides a WLAN suspending management method and terminal. The embodiment of the present disclosure is implemented to at least partially solve the problem that UE cannot effectively monitor a WLAN status.

Embodiment 4

The embodiment of the present disclosure also provides a storage medium, in which a computer program is stored, the computer program being configured to run to execute the operations in any abovementioned method embodiment.

In the exemplary embodiment, the storage medium may be configured to store a computer program configured to execute the following operations.

In S1, configuration information is acquired, the configuration information being configured to indicate a maximum data amount, allowed to be cached, of a WLAN in a suspended status before UE determines a WLAN connection failure.

In S2, a WLAN status is managed according to the configuration information.

In the exemplary embodiment, the storage medium may include, but not limited to, various medium capable of storing computer programs such as a U disk, a ROM, a RAM, a mobile hard disk, a magnetic disk or an optical disk.

The embodiment of the present disclosure also provides an electronic device, which includes a memory and a processor. A computer program is stored in the memory. The processor is configured to run the computer program to execute the operations in any abovementioned method embodiment.

In some exemplary embodiment, the electronic device may further include a transmission device and an input/output device. The transmission device is connected with the processor, and the input/output device is connected with the processor.

In the exemplary embodiment, the processor in the embodiment may be configured to execute the following operations through the computer program.

In S1, configuration information is acquired, the configuration information being configured to indicate a maximum data amount, allowed to be cached, of a WLAN in a suspended status before UE determines a WLAN connection failure.

In S2, a WLAN status is managed according to the configuration information.

In some exemplary embodiment, specific examples in the embodiment may refer to the examples described in the abovementioned embodiments and optional implementation modes and will not be elaborated in the embodiment.

It is apparent that those skilled in the art should know that each module or each step of the present disclosure may be implemented through a universal computing device. They may be concentrated in a single computing device or distributed in a network formed by multiple computing devices. In some exemplary embodiments, they may be implemented by program codes executable for the computing devices and thus may be stored in a storage device for execution with the computing devices. Moreover, in some cases, the shown or described operations may be executed in sequences different from those described here, or may form various integrated circuit modules respectively, or multiple modules or operations therein may form a single integrated circuit module for implementation. Therefore, the present disclosure is not limited to any specific hardware and software combination.

The above is only the exemplary embodiment of the present disclosure and not intended to limit the present disclosure. For those skilled in the art, the present disclosure may have various modifications and variations. Any modifications, equivalent replacements, improvements and the like made within the principle of the present disclosure shall fall within the scope of protection of the present disclosure.

INDUSTRIAL APPLICABILITY

According to the WLAN status management solution provided in the embodiments of the present disclosure, the configuration information configured to indicate the maximum data amount, allowed to be cached, of the WLAN in the suspended status before the UE determines the WLAN connection failure is acquired, so that the UE can timely update a setting of a WLAN connection status and report the WLAN connection status, and the technical problem in the related art that UE cannot effectively monitor a WLAN status can be solved.

What is claimed is:

1. A Wireless Local Area Network (WLAN) status management method, comprising:
   acquiring configuration information, the configuration information being configured to indicate a maximum data amount, allowed to be cached, of a WLAN in a suspended status before User Equipment (UE) determines a WLAN connection failure; and
   managing a WLAN status according to the configuration information;
   wherein managing the WLAN status according to the configuration information comprises: statistically judging cached data amount of the WLAN in the suspended status when the UE sets the WLAN status to be "suspended"; and when the cached data amount of the WLAN in the suspended status reaches the maximum data amount, setting the WLAN status of the UE to be "failure".

2. The method as claimed in claim 1, wherein acquiring the configuration information comprises:
   receiving, by the UE, first configuration information sent by a base station.

3. The method as claimed in claim 2, after acquiring the configuration information, further comprising:
   when WLAN connections with all WLANs in a WLAN mobility set change to be temporarily unavailable, setting the WLAN status of the UE to be "suspended"; and
   setting and starting, by the UE, a first counter according to a first suspending amount, the first configuration information comprising the first suspending amount.

4. The method as claimed in claim 3, wherein managing the WLAN status according to the configuration information comprises:
   when a last WLAN connection status report of the UE indicates that a WLAN connection status of the UE is "suspended" and the WLAN connection with any WLAN in the WLAN mobility set is successfully reestablished or kept, setting, by the UE, the WLAN status to be "resumed" and stopping and resetting, by the UE, the first counter.

5. The method as claimed in claim 3, wherein managing the WLAN status according to the configuration information comprises:
   when the first counter reaches the first suspending amount, setting the WLAN status of the UE to be "failure", and stopping WLAN status monitoring and WLAN connection attempting.

6. The method as claimed in claim 1, wherein acquiring the configuration information comprises:
   acquiring, by a base station, second configuration information from a local preset parameter.

7. The method as claimed in claim 6, after acquiring the configuration information, further comprising:
   when WLAN connections with all the WLANs in the WLAN mobility set change to be temporarily unavailable, setting the WLAN status of the UE to be "suspended";
   executing, by the UE, a WLAN connection status reporting process to obtain a first WLAN connection status report; and
   sending, by the UE, the first WLAN connection status report to the base station, the first WLAN connection status report being configured to trigger the base station to set and start a second counter according to a second suspending amount, the second configuration information comprising the second suspending amount.

8. The method as claimed in claim 7, wherein managing the WLAN status according to the configuration information comprises:
   when a last WLAN connection status report of the UE indicates that the WLAN connection status of the UE is "suspended" and the WLAN connection with any WLAN in the WLAN mobility set is successfully reestablished or kept, setting, by the UE, the WLAN status to be "resumed" and executing, by the UE, the WLAN connection status reporting process to obtain a second WLAN connection status report, the second WLAN connection status report being configured to trigger the base station to stop and reset the second counter.

9. The method as claimed in claim 7, wherein managing the WLAN status according to the configuration information comprises:
when the second counter reaches the second suspending amount, setting, by the base station, the WLAN status of the UE to be "failure", and stopping, by the base station, WLAN connection attempting.

10. The method as claimed in claim 1, wherein the configuration information comprises a joint transmission Long Term Evolution (LTE)-WLAN Aggregation (LWA) configuration between a WLAN network and an LTE network.

11. A Wireless Local Area Network (WLAN) status management device, comprising:
an acquisition module, configured to acquire configuration information, the configuration information being configured to indicate a maximum data amount, allowed to be cached, of a WLAN in a suspended status before User Equipment (UE) determines a WLAN connection failure; and
a setting module, configured to manage a WLAN status according to the configuration information;
wherein the setting module is further configured to statistically judge cached data amount of the WLAN in the suspended status when the UE sets the WLAN status to be "suspended"; when the cached data amount of the WLAN in the suspended status reaches the maximum data amount, set the WLAN status of the UE to be "failure".

12. A storage medium, in which a computer program is stored, the computer program being configured to run to execute the method as claimed in claim 1.

13. An electronic device, comprising a memory and a processor, wherein a computer program is stored in the memory; and the processor is configured to run the computer program to execute the method as claimed in claim 1.

14. The device as claimed in claim 11, wherein the device is set in the UE and the acquisition module is configured to:
receive first configuration information sent by a base station.

15. The device as claimed in claim 14, after the acquisition module acquires the configuration information, the device is further configured to:
when WLAN connections with all WLANs in a WLAN mobility set change to be temporarily unavailable, set the WLAN status of the UE to be "suspended"; and
set and start a first counter according to a first suspending amount, the first configuration information comprising the first suspending amount.

16. The device as claimed in claim 15, wherein the setting module is configured to:
when a last WLAN connection status report of the UE indicates that a WLAN connection status of the UE is "suspended" and the WLAN connection with any WLAN in the WLAN mobility set is successfully reestablished or kept, set the WLAN status to be "resumed" and stop and reset the first counter;
or,
when the first counter reaches the first suspending amount, set the WLAN status of the UE to be "failure", and stop WLAN status monitoring and WLAN connection attempting.

17. The device as claimed in claim 11, wherein the acquisition module is set in a base station and is configured to:
acquire second configuration information from a local preset parameter.

18. The device as claimed in claim 17, after the acquisition module acquires the configuration information, the device is further configured to:
when WLAN connections with all the WLANs in the WLAN mobility set change to be temporarily unavailable, set the WLAN status of the UE to be "suspended";
executing, at the UE, a WLAN connection status reporting process to obtain a first WLAN connection status report; and
sending, at the UE, the first WLAN connection status report to the base station, the first WLAN connection status report being configured to trigger the base station to set and start a second counter according to a second suspending amount, the second configuration information comprising the second suspending amount.

19. The device as claimed in claim 18, wherein the setting module is set in the UE and is configured to:
when a last WLAN connection status report of the UE indicates that the WLAN connection status of the UE is "suspended" and the WLAN connection with any WLAN in the WLAN mobility set is successfully reestablished or kept, set the WLAN status to be "resumed" and execute the WLAN connection status reporting process to obtain a second WLAN connection status report, the second WLAN connection status report being configured to trigger the base station to stop and reset the second counter.

20. The device as claimed in claim 18, wherein the setting module is set in the base station and is configured to:
when the second counter reaches the second suspending amount, set the WLAN status of the UE to be "failure", and stop WLAN connection attempting.

* * * * *